(12) United States Patent
Bonnier et al.

(10) Patent No.: US 8,559,299 B2
(45) Date of Patent: Oct. 15, 2013

(54) MOBILE GATEWAYS IN POOL FOR SESSION RESILIENCE

(75) Inventors: Staffan Bonnier, Askim (SE); Hans-Åke Lund, Bohus (SE); Lars Gunnar Folke Ahlström, Vastra Frolunda (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 391 days.

(21) Appl. No.: 12/957,310

(22) Filed: Nov. 30, 2010

(65) Prior Publication Data

US 2012/0134259 A1    May 31, 2012

(51) Int. Cl.
 *G01R 31/08* (2006.01)
 *G06F 11/16* (2006.01)
(52) U.S. Cl.
 USPC ............................ 370/219; 370/221; 370/401
(58) Field of Classification Search
 None
 See application file for complete search history.

(56) References Cited

U.S. PATENT DOCUMENTS

| | | | |
|---|---|---|---|
| 7,080,151 B1 | 7/2006 | Borella et al. | |
| 7,590,760 B1 | 9/2009 | Banks et al. | |
| 2004/0047286 A1 | 3/2004 | Larsen et al. | |
| 2010/0220656 A1* | 9/2010 | Ramankutty et al. | 370/328 |
| 2011/0141879 A1* | 6/2011 | Ballard | 370/217 |
| 2011/0235505 A1* | 9/2011 | Eswara et al. | 370/221 |
| 2012/0023360 A1* | 1/2012 | Chang et al. | 714/4.11 |

FOREIGN PATENT DOCUMENTS

WO    2008081007 A1    7/2008

OTHER PUBLICATIONS

3GPP.com, "3rd Generation Partnership Project: Technical Specification Group Services and System Aspects; Policy and Charging Control Architecture (Release 10)", 2010, 126 pages.
Ericsson AB, "IP Core Pooling: Enhanced User Experience & Improved Profitability", Aug. 2006, 14 pages.
European Telecommunications Standards Institute, "Digital Cellular Telecommunications System (Phase 2+); Universal Mobile Telecommunications System (UTMS); Support of Mobile Number Portability (MNP); Technical Realization; Stage 2 (3GPP TS 23.066 version 9.0.0 Release 9)", 2010, 86 pages.
European Telecommunications Standards Institute, "LTE; General Packet Radio Service (GPRS) enhancements for Evolved Universal Terrestrial Radio Network (E-UTRAN) access (3GPP TS 23.401 version 9.5.0 Release 9)", 2010, 261 pages.

(Continued)

Primary Examiner — Marcus R Smith
(74) Attorney, Agent, or Firm — Blakely Sokoloff Taylor & Zafman LLP

(57) ABSTRACT

Embodiments of the invention include a method for providing UE session resilience performed in a first PDN-GW that is coupled to a second PDN-GW, which are both in a PDN-GW pool. The method provides UE session resilience by allowing the first PDN-GW to provide connectivity for UE sessions previously serviced by the second PDN-GW after the second PDN-GW becomes non-operational. The first PDN-GW recognizes that the second PDN-GW failed and then activates a plurality of standby UE sessions. Each standby UE session is a backup UE session corresponding to a previously active UE session serviced on the second PDN-GW. Each standby UE session is associated with a UE device and a network resource identifier of an APN slice. The first PDN-GW transmits a message to a SGW that is servicing the UE sessions that indicates that the SGW should direct traffic previously bound for the second PDN-GW to the first PDN-GW.

11 Claims, 9 Drawing Sheets

(56) References Cited

OTHER PUBLICATIONS

European Telecommunications Standards Institute, "Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 9.3.0 Release 9)", 2010, 158 pages.

* cited by examiner

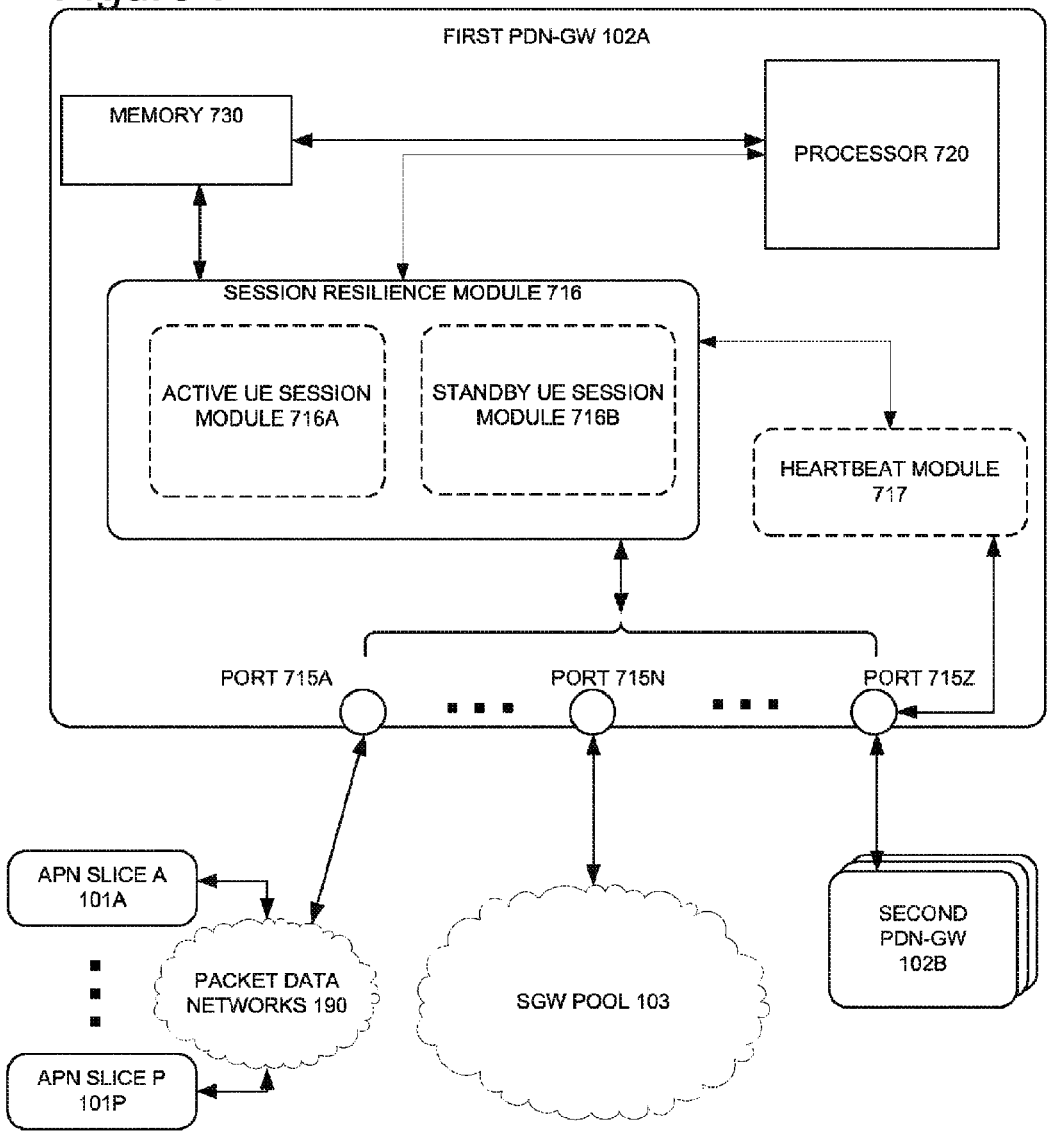

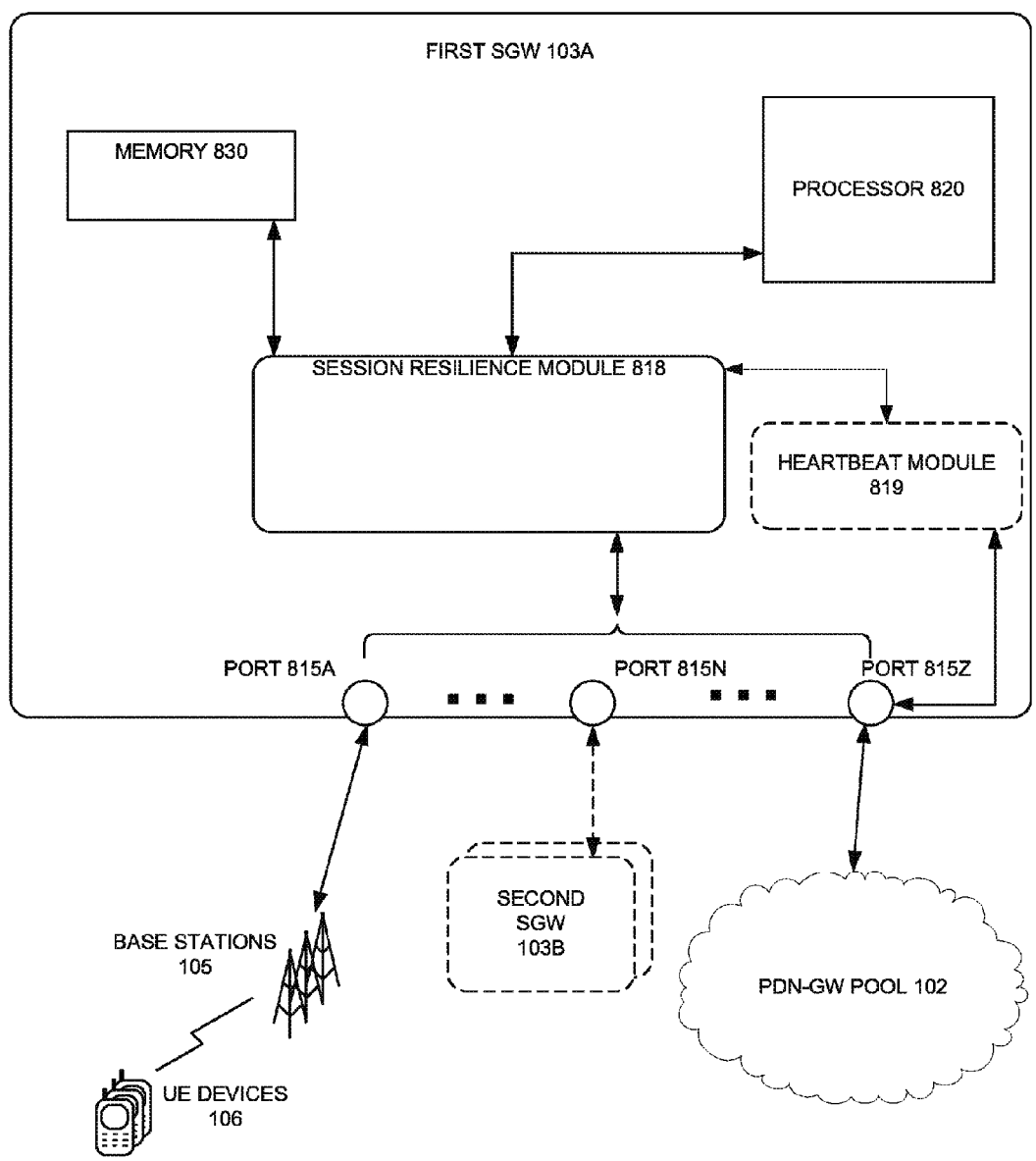

MOBILE GATEWAYS IN POOL FOR SESSION RESILIENCE

FIELD OF THE INVENTION

Embodiments of the invention relate generally to the field of telecommunications; and more particularly, to mobile gateway pools.

BACKGROUND

The 3rd Generation Partnership Project (3GPP) sets standards and technical specifications for a 3G mobile system referred to as Long Term Evolution (LTE). The LTE system includes an Evolved Packet System (EPS) with a main component called Evolved Packet Core (EPC). EPC comprises three main subcomponents: a Mobility Management Entity (MME), a serving gateway (SGW), and a packet data network gateway (PDN-GW). The 3GPP published "LTE; General Packet Radio Service (GPRS) enhancements for Evolved Universal Terrestrial Radio Access network (E-UTRAN) access," TS 23.401 Version 9.5.0 Release 9, defining the EPS service description.

In LTE, a user equipment (UE) device, such as a mobile phone, communicates with a SGW which in turn communicates with a PDN-GW. The PDN-GW communicates further with an internet protocol (IP) service such as an IP multimedia subsystem (IMS), voice over IP (VOIP), and mobile broadband. The operator's IP services are provided over an IP-PDN that is identified by a UE device with an access point name (APN). The series of communications between an APN and a UE device provide data connectivity to UE devices in the LTE mobile system and is referred to as a PDN connection. Thus, in each PDN connection, the PDN-GW couples an SGW with the APN and the SGW couples the UE device with the PDN-GW. In this scenario, each PDN connection (also referred to as a UE session) has corresponding PDN connection information (also referred to as UE session information).

However, 3GPP's specification of LTE does not address some of the mission critical aspects of EPC. For example, the specification does not address geographic redundancy, where one or more PDN-GWs or SGWs may be lost. Nor does the specification address in-service maintenance, where any PDN-GW or SGW must be brought out of service for maintenance.

Given that EPS targets full migration of voice services to IP-PDNs, operators are becoming more and more concerned with redundancy scenarios. 1+1 network level solutions exist, but such solutions are unnecessarily costly, since 50% of the available processing and forwarding capacity is used only for redundancy.

SUMMARY OF THE INVENTION

Embodiments of the invention include a method for providing user equipment (UE) session resilience performed in a first packet data network gateway (PDN-GW) that is coupled to a second PDN-GW in a PDN-GW pool. The PDN-GW pool is to provide data connectivity between UE devices and an external packet data network through an access point name. The method provides UE session resilience by allowing the first PDN-GW to provide connectivity for one or more UE sessions previously serviced by the second PDN-GW after the second PDN-GW becomes non-operational. The first PDN-GW recognizes that the second PDN-GW is entering a non-operational state and activates a plurality of standby UE sessions. Each standby UE session is a synchronized UE session for which the second PDN-GW was the active PDN-GW. Further, each UE session is associated with a UE device and a network resource identifier which identifies an APN slice that represents a subset of internet protocol addresses in the external PDN. The first PDN-GW transmits a message to a SGW that is providing data connectivity between one or more of the UE devices and the PDN-GW pool. The message indicates that the first PDN-GW has activated standby UE sessions associated with one or more UE devices serviced by the SGW. The first PDN-GW transmits the message with the intention that the SGW directs traffic previously bound for the second PDN-GW to the first PDN-GW. In this way, UE session resilience is achieved in a PDN-GW pool by allowing the first PDN-GW to activate the plurality of standby UE sessions without notifying each UE device associated with a standby UE session on the first PDN-GW.

Embodiments of the invention include a method performed in a serving gateway (SGW) for providing user equipment (UE) session resilience by allowing the SGW to reroute traffic between a packet data network gateway (PDN-GW) pool from a first PDN-GW to a second PDN-GW. The SGW is coupled to a first PDN-GW and a second PDN-GW, and the SGW is for providing data connectivity between a UE device and the PDN-GW pool. The PDN-GW pool provides data connectivity between the SGW and an external PDN. The SGW creates a network resource identifier (NRI) map by inserting a plurality of NRI map entries in the NRI map. A first NRI map entry associates a first NRI with the first PDN-GW as the active PDN-GW for a first NRI. The first NRI is associated with a first slice of an access point name (APN) that represents a subset of internet protocol addresses in the external PDN and the UE device is in communication with the first slice of the APN. The SGW routes data traffic for UE session to the first PDN-GW, the UE session for traffic between the UE device and the first slice of the APN. The SGW receives a message indicating that the first PDN-GW entered a non-operation state. In response to the message, the SGW updates the first NRI map entry to indicate an association between the first NRI and the second PDN-GW as the active PDN-GW for the first NRI. Further in response, the SGW routes data traffic for the UE session to the second PDN-GW. In this way, UE session resilience is achieved by allowing the SGW to reroute data traffic from the UE device to an active PDN-GW without notifying the UE device of a change from the first PDN-GW to the second PDN-GW as the active PDN-GW for that UE device's UE session.

Embodiments of the invention include a first packet data network gateway (PDN-GW) to be coupled to a second PDN-GW over a data tunnel in a PDN-GW pool. The PDN-GW pool is to provide data connectivity between an external PDN and a user equipment (UE) device. The first PDN-GW is to provide UE session resilience by providing data connectivity for one or more UE sessions previously serviced by the second PDN-GW after the second PDN-GE becomes non-operational. The first PDN-GW includes a processor and a set of one or more ports coupled to the processor and is further coupled to a serving gateway (SGW) pool and one or more access point name (APN) slices, each APN slice representing a subset of internet protocol addresses in the external PDN. A memory is coupled to the processor to store a plurality of active UE sessions and to store a plurality of standby UE sessions. Each active and standby UE session is to be associated with a UE device and a network resource identifier of one of the one or more APN slices. The first PDN-GW further includes a session resilience module coupled to the memory to maintain the plurality of active UE sessions and standby UE sessions. The session resilience module is configured to recognize when the second PDN-GW enters a non-operational state. In response to recognizing when the second PDN-GW enters a non-operational state, the first PDN-GW is to activate one or more of the plurality of standby UE sessions, each activated standby UE session to be associated with the second PDN-GW. The first PDN-GW is configured to further notify the SGW pool that the first PDN-GW has activated the one or more of the plurality of standby UE sessions. In this way, UE session resilience is achieved by allowing the first PDN-GW to activate a plurality of standby UE sessions without notifying each UE device associated with a standby UE session on the first PDN-GW.

Embodiments of the invention include a serving gateway to be coupled to a user equipment (UE) device and a packet data network gateway (PDN-GW) pool comprised of a first PDN-GW and a second PDN-GW. The SGW is to provide data connectivity between the UE device and the PDN-GW pool and provide UE session resilience by allowing the SGW to reroute traffic between the PDN-GW pool and UE device from the first PDN-GW to the second PDN-GW. The SGW comprises a processor and a set of one or more ports coupled to the processor and to be coupled to one or more access point name (APN) slices, each APN slice representing a subset of internet protocol addresses in the external PDN. The SGW further comprises a memory coupled to the process to store a network resource identifier (NRI) map configured to store NRI map entries that associate an NRI with an active PDN-GW, wherein each NRI identifies one or more APN slices. The SGW further comprises a session resilience module coupled to the memory. The session resilience module to maintain a plurality of UE session and maintain the NRI map. The session resilience module configured to create a first NRI map entry to associate a first NRI with the first PDN-GW as the active PDN-GW for the first NRI. The session resilience module further configured to route data traffic associated with the first NRI to the first PDN-GW and configured to receive notification that the first PDN-GW entered a non-operational state. The session resilience module further configured to update the first NRI map entry to associate the first NRI with the second PDN-GW as the active PDN-GW for the first NRI and configured to route data traffic associated with the first NRI to the second PDN-GW. In this way, UE session resilience is achieved by allowing the SGW to reroute data traffic from the UE device to an active PDN-GW without notifying the UE device of a change from the first PDN-GW to the second PDN-GW as the active PDN-GW for that UE device's UE session.

BRIEF DESCRIPTION OF THE DRAWINGS

The present invention is illustrated by way of example, and not by way of limitation, in the figures of the accompanying drawings in which like references indicate similar elements.

The invention may best be understood by referring to the following description and accompanying drawings that are used to illustrate embodiments of the invention. In the drawings:

FIG. 7 is a block diagram illustrating a system including a PDN, a SGW pool, and a plurality of PDN-GWs (with one being shown in an exploded view) for providing N+M pooled session resilience according to embodiments of the invention.

FIG. 8 is a block diagram illustrating a system including a PDN-GW, a UE device, and a set of one or more SGWs (with one being shown in an exploded view) for providing N+M pooled session resilience according to embodiments of the invention.

DETAILED DESCRIPTION

Figure 1A:
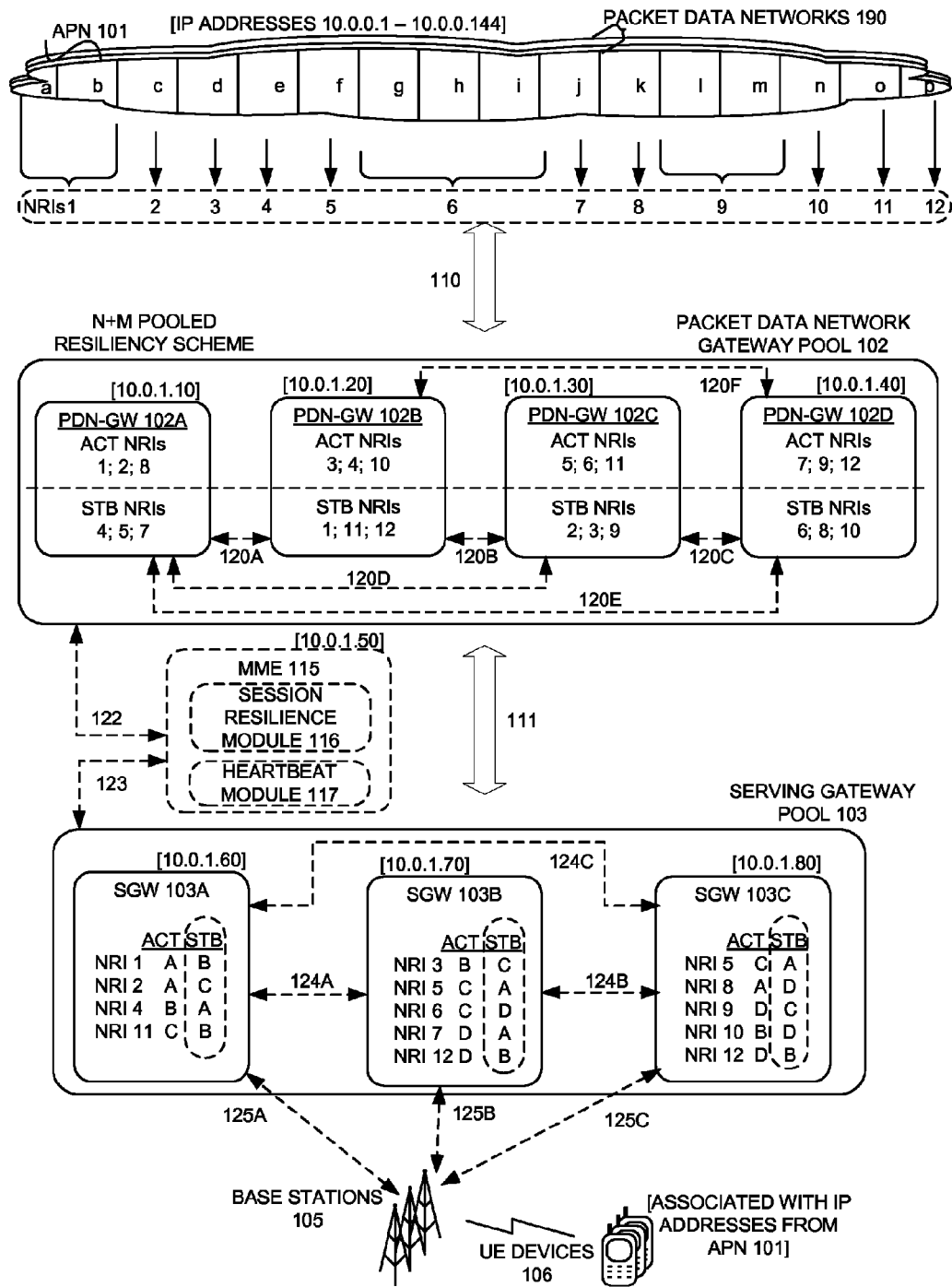
FIG. 1A is a block diagram illustrating a PDN-GW pool 102 implementing an N+M pooled resiliency scheme according to embodiments of the invention.

In the following description, numerous specific details resource partitioning/sharing/duplication implementations, types and interrelationships of system components, and integration choices are set forth in order to provide a more thorough understanding of the present invention. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Embodiments of the invention provide UE session resilience through redundancy at the PDN-GW pools and the SGW pools. For each pool, embodiments of the invention provide geographic N+M redundancy and allow for in-service maintenance of the PDN-GWs and the SGWs. N+M redundancy within a pool allows up to M pool elements to be lost (with intermediate session recovery using the methods described later) without impacting the service for on-going UE sessions. As a PDN connection is created, each pool element stores UE session information corresponding that that PDN connection. In one embodiment, the UE session information comprises the IP address assigned from the PDN to the UE device along with information identifying the PDN-GW and the SGW that is servicing the PDN connection. Geographic N+M redundancy allows all PDN connections (connections between UE devices and DNs, also called UE sessions) serviced by a given pool element (PDN-GW or SGW) to have backup replicas of the corresponding UE session information evenly distributed over the remaining pool elements. In-service maintenance (including in-service software upgrades) occurs by bringing a pool element in or out of service without impacting ongoing UE sessions. While geographic redundancy can be used for this purpose, the implied failover to a backup node generally causes unnecessary disturbances; hence the need to use a smoother mechanism for maintenance.

The general strategy may be further understood through the embodiment shown in FIG. 1A. FIG. 1A is a block diagram illustrating a PDN-GW pool 102 implementing an N+M pooled resiliency scheme according to embodiments of the invention.

At the top of the Figure, a plurality of PDNs 190 are illustrated as three clouds. The PDNs are coupled to PDN-GWs, and in FIG. 1A, the first PDN, which is assigned as APN 101, is coupled to a PDN-GW pool 102. APNs typically consist of two parts: a network identifier and an optional operator identifier. The network identifier of an APN identifies the PDN the UE device 106 is coupling to through a PDN connection; typical APN network identifiers correspond with the IP services desired by the UE device 106 such as General Packet Radio Services, Internet, and Multimedia Messaging Service. In the example of FIG. 1A, APN 101 is assigned to a PDN that contains a plurality of IP addresses, 10.0.0.1-10.0.0.144, and APN 101 is sliced into 16 APN slices 101a-101p. Each APN slice 101a-101p is assigned to a network resource identifier (NRI) and encompasses a subset of the plurality of IP addresses within the PDN. The multiple APN slices may be assigned to the same NRI and this is fully configurable. In FIG. 1A, the exemplary APN slice assignments are:

1. APNs 101a and 101b assigned to NRI 1;
2. APN 101c assigned to NRI 2;
3. APN 101d assigned to NRI 3;
4. APN 101e assigned to NRI 4;
5. APN 101f assigned to NRI 5;
6. APNs 101g-101i assigned to NRI 6;
7. APN 101j assigned to NRI 7;
8. APN 101k assigned to NRI 8;
9. APNs 101l-101m assigned to NRI 9;
10. APN 101n assigned to NRI 10;
11. APN 101o assigned to NRI 11; and
12. APN 101p assigned to NRI 12.

As described above, APN 101 is coupled to PDN-GW pool 102 through data connection 110. The exemplary PDN-GW pool 102 comprises 4 PDN-GWs 102A-102D, although other embodiments may utilize fewer or more PDN-GWs. Each PDN-GW 102A-102D is assigned an IP address 10.0.1.10, 10.0.1.20, 10.0.1.30, and 10.0.1.40 respectively. In one embodiment, each PDN-GW 102A-102D is optionally coupled to each of the other PDN-GWs 102A-102D through data connections 120A-120F.

In FIG. 1A, each PDN-GW is servicing a plurality of active UE sessions. For example, when a UE device 106 forms a PDN connection with the PDN identified as APN 101 that UE device will be coupled to an IP address in one of the NRIs. If, for example, the UE device is coupled with an IP address in NRI 1 then the UE device will have an active UE session on PDN-GW 102A which is servicing active sessions for NRI 1. The UE sessions are not shown in FIG. 1A as many sessions, both active and standby, may exist for each NRI on the PDN-GWs, active and standby, that are servicing that NRI.

Each PDN-GW 102A-102D has is servicing active UE sessions for three NRIs within APN 101. PDN-GW 102A is servicing active UE sessions coupled to NRI 1, NRI 2, and NRI 8. PDN-GW 102B is servicing UE sessions coupled to NRI 3, NRI 4, and NRI 10. PDN-GW 102c is servicing UE sessions coupled to NRI 5, NRI 6, and NRI 11. PDN-GW 102D is servicing UE sessions coupled to NRI 7, NRI 9, and NRI 12. It should be understood, that each PDN-GW could service more or less APN slices assigned to the NRIs. Furthermore, each PDN-GW could service multiple UE sessions, each corresponding to a different UE device, assigned to the same NRI.

Each PDN-GE 102A-102D is also servicing a plurality of standby UE sessions that each correspond to an active UE session serviced by one of the other PDN-GWs 102A-102D. PDN-GW 102A is servicing standby UE sessions coupled to NRI 4, NRI 5, and NRI 7. PDN-GW 102B is servicing standby UE sessions coupled to NRI 1, NRI 11, and NRI 12. PDN-GW 102c is servicing standby UE sessions coupled to NRI 2, NRI 3, and NRI 9. PDN-GW 102D is servicing standby UE sessions coupled to NRI 6, NRI 8, and NRI 10. Thus, in the embodiment of FIG. 1A, each PDN-GW 102A-102D is servicing standby UE sessions coupled to three different NRIs. Each of these standby UE sessions correspond to active UE sessions which are being serviced by one of the other PDN-GWs.

As time goes by, each PDN-GW 102A-102D receives session information corresponding with the standby UE sessions that PDN-GW is servicing. As the standby UE sessions are created, these sessions are maintained in synchronization with the corresponding active UE sessions such that the PDN-GW pool 102 is prepared to handle the failure of a PDN-GW. In one embodiment, this information is communicated between PDN-GWs 102A-102D across data connections 120A-120D. These data connections 120A-120D may be dedicated links between two PDN-GWs 102A-102D or may be a secondary network topology coupling the PDN-GWs 102A-102D so that communication of UE session information does not hamper the existing communication channels. Data connections 120A-120D are shown in dashed lines to indicate the links can be dedicated to synching session information or may be general purpose data connections that also carry the session information.

The PDN-GW pool 102 is further coupled to an SGW pool 103 through data connection 111. The exemplary SGW pool 103 is comprised of three SGWs 103A-103C, although other embodiments may utilize less or more SGWs. Each SGW 103A-103C couples one or more of the UE devices 106 with the PDN-GW pool 102, thus each SGW 103A-103C services a plurality of UE sessions. SGW 103A has UE sessions for UE devices coupled with NRI 1, NRI 2, NRI 4, and NRI 11. SGW 103B has UE sessions for UE devices coupled with NRI 3, NRI 5, NRI 6, NRI 7, and NRI 12. SGW 103C has UE sessions for UE devices coupled with NRI 5, NRI 8, NRI 9, NRI 10, and NRI 12. Each SGW 103A-103C has an NRI map with NRI map entries indicating, at least, the active PDN-GW for each NRI. In another embodiment, the NRI map entries further identify a standby PDN-GW for each NRI as shown in the dashed ovals in the SGWs 103A-103C of FIG. 1A. In one embodiment, each SGW 103A-103C is coupled with each of the other SGWs 103A-103C across data connections 124A-124C. The SGWs 103A-103C are coupled, through data connections 125A-125C, to one or more base stations 105 further coupling the SGWs 103A-103C with the UE devices 106. Each of the UE devices 106 is associated with an IP address that resides in one of the slices of APN 101.

In one embodiment, FIG. 1A further includes an MME 115 coupled to the PDN-GW pool 102 through data connection 122 and coupled to the SGW pool 103 through data connection 123. The MME is responsible for tracking idle UE devices and performing UE device reachability procedures. According to 3GPP TS 23.401, the MME assigns one of the SGWs 103A-103C and one of the PDN-GWs 102A-102D for each PDN connection. In embodiments of the invention, the PDN-GWs 102A-102D correspond to NRIs and thus the MME assigns an NRI for a PDN connection which dictates the responsible PDN-GW. Optionally, the MME includes a session resilience module 116 that assigns PDN-GWs 102A-102D as active or standby PDN-GWs for the NRIs 1-12. The session resilience module 116 further transmits NRI map entry information to the SGWs 103A-103C to inform each SGW which PDN-GW is serving as active PDN-GW and which PDN-GW is serving as standby PDN-GW for a given NRI. Furthermore, the session resilience module 116 transmits indications to the SGWs 103A-103C to switch from an active PDN-GW to a standby PDN-GW for a given NRI in response to a PDN-GW entering a non-operational state. In a further embodiment, session resilience module 116 is responsible for transmitting updated UE session information from one of the PDN-GWs 102A-102D to the standby PDN-GW for that UE session. Optionally, the MME 115 also includes a heartbeat module 117 that transmits status inquiry messages to the PDN-GWs 102A-102D and notifies the session resilience module 116 in the event that a PDN-GW fails to respond to the status inquiry message. While some embodiments includes the MME 115, in alternative embodiments of the invention the MME operations are performed by another entity (e.g., in one of the PDN-GWs, one of the SGW, distributed between one PDN-GW and one SGW, distributed over multiple of the PDN-GWs, distributed over multiple of the SGWs, distributed over multiple of the SGWs).

In FIG. 1A, each PDN-GW and each SGW is associated with an IP address that is indicated above the corresponding element in brackets. For example, PDN-GW 102A is associated with 10.0.1.10 as its IP address. However in another embodiment of the invention, each NRI has an IP address in the PDN-GW pool. In this embodiment, the PDN-GW servicing UE sessions for each NRI receives data traffic designated for that NRIs IP address. In either case, the PDN-GW pool exports routing information protocol (RIP) information indicating the active PDN-GW IP address as the next hop for IP addresses in each corresponding NRI. In one embodiment utilizing a single IP address for each PDN-GW, the RIP information further indicates the standby PDN-GW IP address as the next hop for IP address in each corresponding NRI. In the embodiment including both an active and standby PDN-GW, the metric (or statistics associated with the metric such as communication cost, hop count, network delay, path cost) associated with the active PDN-GW is considerably less than the metric associated with the standby PDN-GW to ensure that traffic is routed to the active PDN-GW.

In FIG. 1A, the NRI maps in the SGWs 103A-103D identify each PDN-GW 102A-102D by the corresponding letter A-D. In one embodiment, the NRI maps identify each PDN-GW 102A-102D by that PDN-GW's IP address, e.g. 10.0.1.20 for PDN-GW 102B. In embodiments for which each NRI has an IP address in the PDN-GW pool, the NRI IP address is used in the NRI map to indicate which IP address traffic is directed for a given NRI. Furthermore, although the figures show each PDN-GW and SGW as identified by a letter, other embodiments can use any number of different identifier types (e.g., assign a non-negative pool element identifier to each pool element for identification purposes). In embodiments utilizing a plurality of IP address for each pool element, the PDN-GW pool and the SGW pool maintains a pool element identifier map indicating which IP addresses correspond to each pool element and NRI.

When a PDN connection between a PDN and a UE device is first created, a number of selections must be performed. The MME initially selects an SGW to service the PDN connection and transmits a GTP-C Create Session Request to the SGW. If one of the SGW already serves one or more PDN connections for the same UE device then the same SGW as for those PDN connections is used. Otherwise, any SGW may be used with a preference toward balancing all PDN connections across the available SGWs.

Further, when a PDN-GW receives a PDN connection request (also called a GTP-C Create Session Request) if the PDN-GW is servicing one or more NRIs associated with an APN slice of the selected APN then the PDN-GW selects one of the associated NRIs and allocates an IP address in that NRI for the PDN connection. If the PDN-GW is not servicing an NRI associated with a slice of the selected APN then the PDN-GW has two options. One, the PDN-GW can use a preconfigured APN slice map to determine an NRI to use and allocate an associated IP address for the PDN connection. Two, the PDN-GW can determine if another one of the PDN-GWs is servicing an NRI in the APN and forward the PDN connection request to the other PDN-GW.

In one embodiment, a typical PDN connection follows the following steps once the SGW selection and PDN-GW selection occurs. First, a GTP-C Create Session Request is sent from the MME to the selected SGW. A GTP-C Create Session Request is sent from the selected SGW to the selected PDN-GW. The PDN-GW becomes the active PDN-GW for that UE session and responds to the selected SGW with a GTP-C Create Session Response indicating that it will act as the active PDN-GW and includes that PDN-GW's IP address. The selected PDN-GW also forwards the GTP-C Creates Session Request to the standby PDN-GW for the corresponding NRI and the standby PDN-GW forwards a GTP Session Response to the selected SGW that indicates it will act as the standby PDN-GW and that includes that PDN-GW's IP address. The selected SGW records the active PDN-GW's IP address and the standby PDN-GW's IP address in an NRI map entry. The selected SGW then sends a GTP-C Create Session Response to the MME.

Figure 1B:
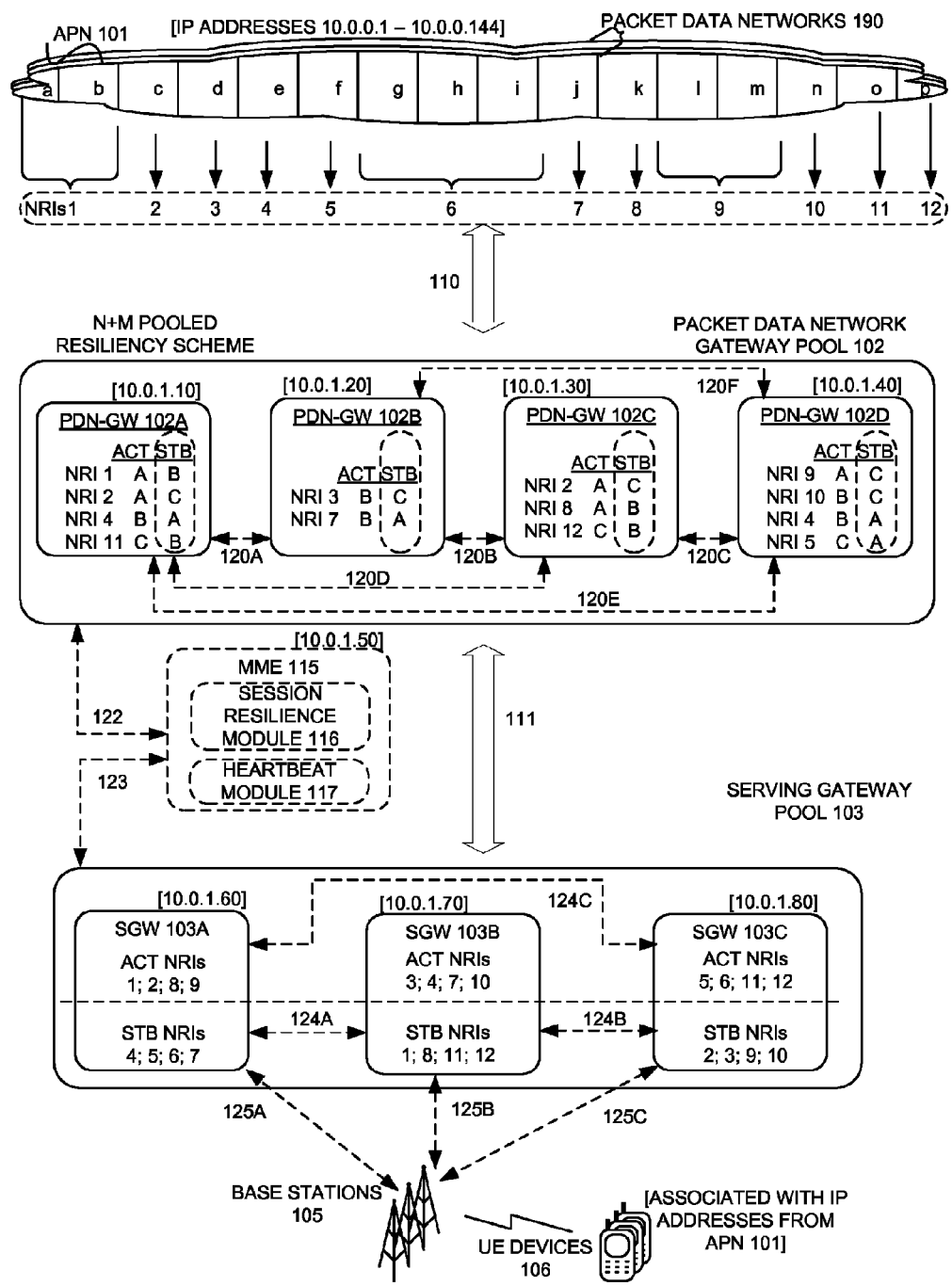
FIG. 1B is a block diagram illustrating a SGW pool 103 implementing an N+M pooled resiliency scheme according to embodiments of the invention.

The methods and embodiments are described with reference to maintaining active and standby UE sessions on the PDN-GW and maintaining associated NRI maps on the SGWs. However, one skilled in the art would recognize that alternative embodiments allow for the active and standby UE sessions on the SGW and maintenance of associated NRI maps on the PDN-GWs. In such a case, the same session resilience achieved at the PDN-GW pool 102 would be achieved at the SGW pool 103 with similar methods and embodiments. For example, FIG. 1B is a block diagram illustrating a SGW pool 103 implementing an N+M pooled resiliency scheme according to embodiments of the invention. This figure is essentially identical to FIG. 1A except that each SGW, rather than the PDN-GW, is servicing a plurality of active UE sessions and a plurality of standby UE sessions. As similar to FIG. 1A, each NRI is serviced by two SGWs. One SGW acts as an active SGW for an NRI and another SGW acts as a standby SGW for that NRI. Further, as similarly described with reference to the SGWs 103A-103C in FIG. 1A, each PDN-GW 102A-102D has an NRI map with NRI map entries indicating, at least, the active SGW for each NRI. In another embodiment, the NRI map entries further identify a standby SGW for each NRI as shown in the dashed ovals in the PDN-GWs 102A-103D of FIG. 1B. Thus, session resilience may be provided at the SGW pool 103 in a similar manner as the PDN-GW pool 102.

Figure 2:
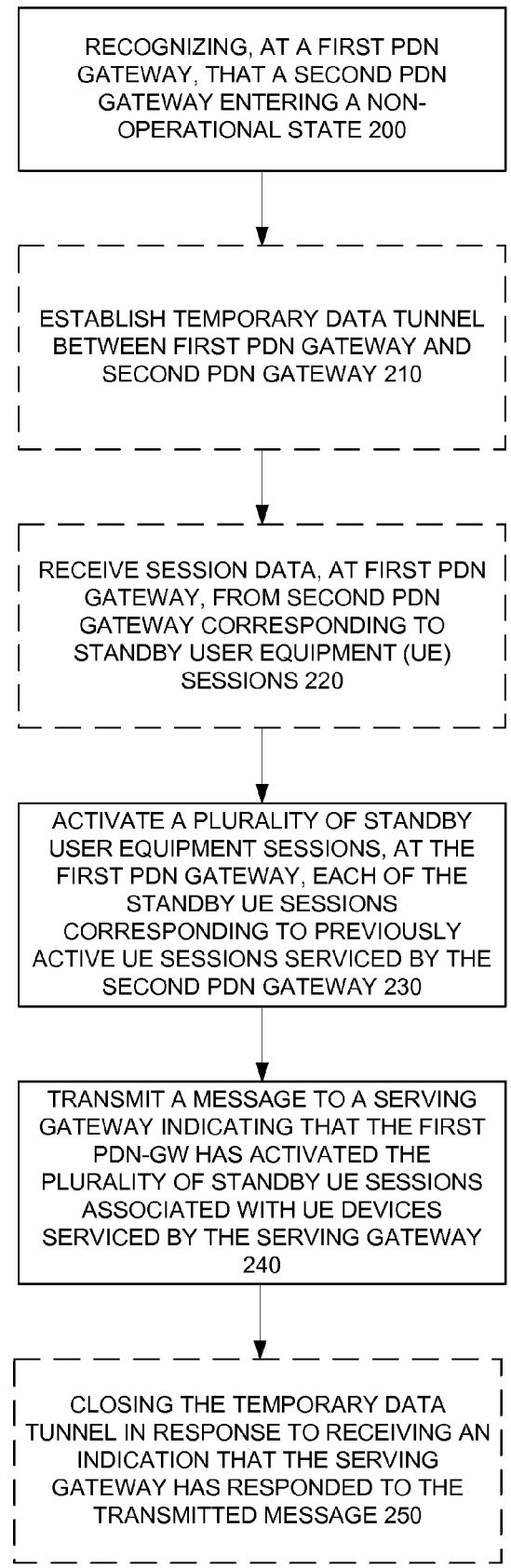
FIG. 2 is a flow chart illustrating a method for switching from a first PDN-GW to a second PDN-GW as the active PDN-GW for an NRI according to embodiments of the invention.

FIG. 2 is a flow chart illustrating a method for switching from a first PDN-GW to a second PDN-GW as the active PDN-GW for an NRI according to embodiments of the invention. This figure includes steps that are optional depending on the specific implementation and such steps are shown with dashed boxes. A first PDN-GW, such as PDN-GW 102A, recognizes that a second PDN-GW, such as PDN-GW 102C, is entering a non-operation state (Block 200). In this case, the second PDN-GW 102C is servicing one or more active UE sessions and the first PDN-GW 102A is acting as a standby PDN-GW for at least one of the active UE sessions. The first PDN-GW 102A may recognize the entry into the non-operational state in a number of ways. In one embodiment, the first PDN-GW 102A receives a message that notifies it that the second PDN-GW 102C is entering a non-operational state. In another embodiment, the first PDN-GW 102A includes a heartbeat mechanism or other such mechanism that periodically verifies that the second PDN-GW 102C is still active and is thus able to recognize when the second PDN-GW 102C enters a non-operational state. A non-operational state may arise because a PDN-GW has experienced some sort of failure or may arise because a PDN-GW is being intentionally taken down for maintenance.

In the case where a PDN-GW is being intentionally taken down for maintenance, it is desirable to controllably initiate the handoff of UE sessions from the active PDN-GW to the standby PDN-GW through a graceful switchover. In this scenario, a temporary data tunnel may be established from the first PDN-GW 102A and the second PDN-GW 102C (Block 210). In such a scenario, the second PDN-GW 102C (the PDN-GW going from the active state to a non-operational state) may forward all traffic associated with the active UE sessions moving to the first PDN-GW 102A to the first PDN-GW 102A over the temporary data tunnel. In this way, the UE device(s) will not experience a service interruption while the PDN-GW and SGW switch from second PDN-GW 102C to the first PDN-GW 102A. Furthermore, the first PDN-GW 102A will receive UE session information from the second PDN-GW 102C for all UE sessions being moved from the second PDN-GW 102C to the first PDN-GW 102A to ensure that the first PDN-GW 102A has the most recent session information (Block 220). This information will be used to update the session information for the corresponding standby UE sessions.

In the case of a failure or intentional take down of a PDN-GW, the method continues with the first PDN-GW 102A activating a plurality of standby UE sessions. Each of the activated standby UE sessions corresponds with a previously active UE session that was serviced by the second PDN-GW 102C (Block 230). A message is transmitted to a SGW indicating that the first PDN-GW 102A has activated the plurality of standby UE sessions (Block 240). In one embodiment, the SGW receives a message indicating a new NRI map and, thus, determines which UE sessions should be redirected from the second PDN-GW 102C to the first PDN-GW 102A. In another embodiment, the SGW receives a message indicating that second PDN-GW 102C has entered the non-operational state and the SGW is expected to react by switching to the standby PDN-GW(s) for all UE sessions previously serviced by the second PDN-GW 102C. In another embodiment, the SGW receives a message indicating a plurality of NRIs that must switch from the active PDN-GW 102C to the standby PDN-GW(s) (e.g., 102A) and the SGW is expected to switch the UE sessions corresponding to those NRIs from the previously active PDN-GW 102C to the newly active PDN-GW(s) (e.g., 102A) for those UE sessions. In yet another embodiment, the SGW receives a message from the PDN-GWs that have activated standby UE sessions indicating that the SGW should withdraw the GTP-Path to the failed PDN-GW. In the scenario of a graceful switchover, the second PDN-GW 102C will either expect the SGWs to switch over after a given period of time or receive some indication that SGWs have completed the switch over and, in response to the time period or indication, the temporary data tunnel will be closed (Block 250).

This method is particularly advantageous because of how well it scales regardless of the number of UE devices in the system. Upon the second PDN-GW entering a non-operational state, there is no need to send a separate message for each UE device to each SGW to notify the SGW of the switch to the standby PDN-GW(s). Rather, each affected SGW in the SGW pool will handle the switch to the standby PDN-GW(s) seamlessly without each UE device experiencing a change regarding the PDN connection. Thus, embodiments of the invention address mission critical aspects of the EPC by providing session resiliency and geographic redundancy, where one or more PDN-GWs or SGWs may be lost without affecting existing UE sessions. Further, because embodiments of the invention allow for N+M redundancy, there is less wasted available processing and forwarding capacity as redundancy is spread across the PDN-GW pool 102 and SGW pool 103 depending upon the implementation.

Figure 3:
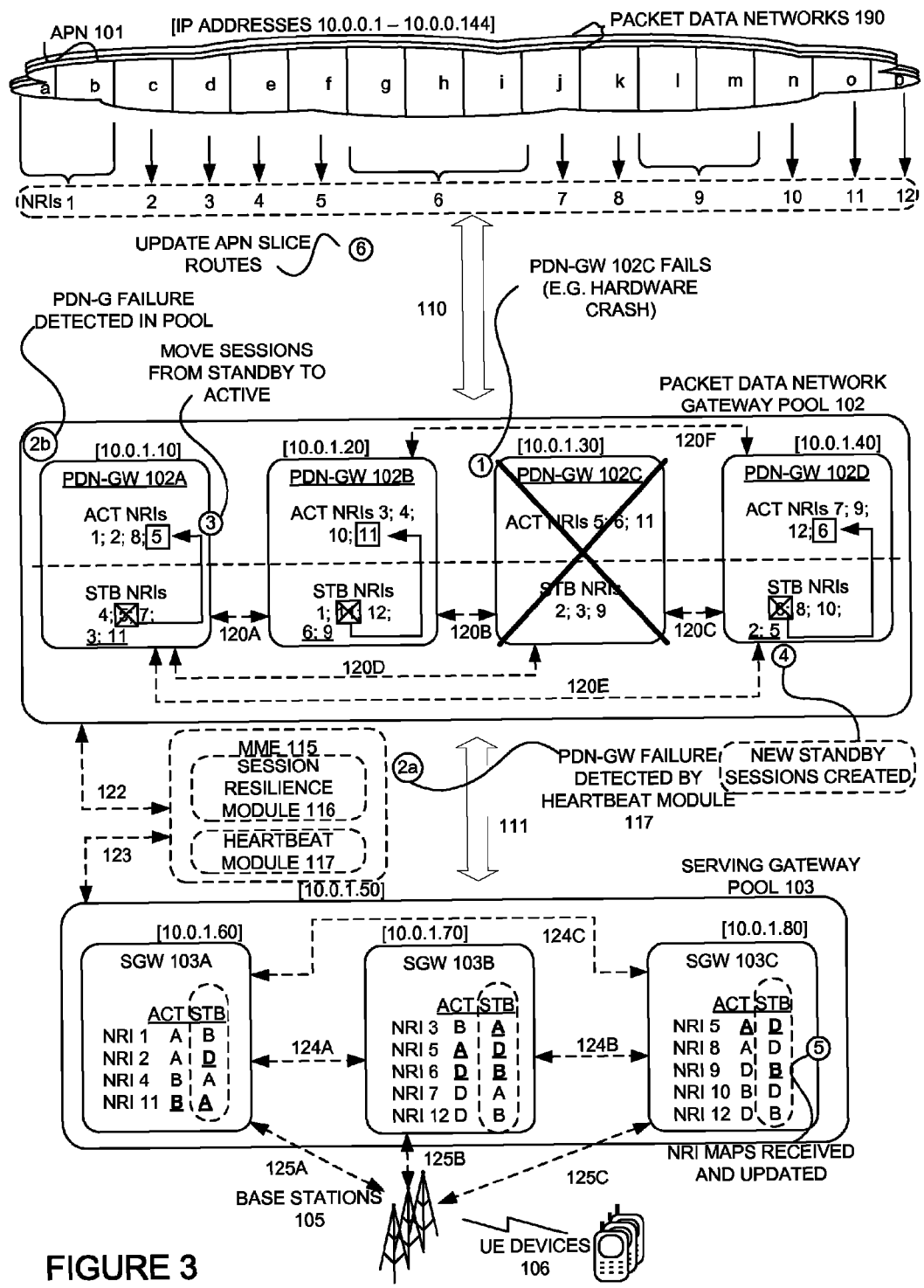
FIG. 3 is a block diagram illustrating PDN-GW pool 102 responding to a PDN-GW failure according to embodiments of the invention.

FIG. 3 is a block diagram illustrating PDN-GW pool 102 responding to a PDN-GW failure according to embodiments of the invention. This figure is identical to FIG. 1A except that it includes a plurality of points/operations and change indications that occur in response to PDN-GW 102C failing (indicated in the figure with a bold X through PDN-GW 102C). Point 1 indicates that PDN-GW 102C has entered into a non-operational state. The example given in the figure is a hardware crash, though any unexpected failure may cause PDN-GW 102C to enter a failure mode. In this embodiment, PDN-GW 102C is servicing UE sessions coupled to NRIs 5, 6, and 11. At point 2a and 2b, the PDN-GW 102C's failure is detected either by the heartbeat module 117 in the MME 15 (as indicated by 2a) or is detected in the PDN-GW pool (as indicated by 2b). Point 3 shows that each PDN-GW 102A, 102B, and 102D moves corresponding UE sessions from standby to active status; this is shown with a box around the NRI with an arrow showing the NRI was moved from standby to active and an X through the NRI in the standby section of the PDN-GW. In the illustrated example, PDN-GW 102A was servicing standby UE session(s) for NRI 5 for PDN-GW 102C and moves those sessions into active status; PDN-GW 102B was servicing standby UE session(s) for NRI 11 for PDN-GW 102C and moves those sessions into active status; and PDN-GW 102D was servicing standby UE session(s) for NRI 6 for PDN-GW 102C and moves those sessions into active status. In point 4, the remaining PDN-GWs 102A, 102B, and 102D take over responsibility for PDN-GW 102C's standby UE session(s) by creating new standby UE session(s) (indicated in the figure with underlining) for the NRIs that PDN-GW 102C previously serviced standby UE sessions. In the illustrated example, PDN-GW 102A creates new standby UE sessions for NRIs 3 and 11; PDN-GW 102B creates new standby UE sessions for NRIs 6 and 9; and PDN-GW 102B creates new standby UE sessions for NRIs 2 and 5. Point 5 indicates that the SGW pool 103 receives either new NRI maps or indications as to the changes required to the NRI maps because of PDN-GW 102C's failure. All NRI map entries previously indicating PDN-GW 102C as the active PDN-GW must be updated to indicate the PDN-GW servicing the newly activated UE sessions for the corresponding NRI. In the illustrated example, the active PDN-GW must be updated for all entries corresponding with NRIs 5, 6, and 11. In one embodiment, the NRI map also includes standby PDN-GWs in the NRI map entries and those entries indicating PDN-GW 102C as the standby PDN-GW must be updated to indicate the PDN-GW that took over responsibility for those standby UE sessions (i.e., those PDN-GWs that created new standby UE sessions for the corresponding NRIs). In FIG. 3, the updated NRI map entries are bolded and underlined to indicate that a new PDN-GW is indicated by the NRI map.

In embodiments for which each NRI has an IP address in the PDN-GW pool, point 5 behaves in a different fashion. Specifically, it is not necessary for the NRI map entries to be updated since the IP address associated with an NRI will not change. Rather, as each PDN-GW activates standby UE sessions corresponding with an NRI, that PDN-GW also begins receiving traffic from the SGWs and the PDN destined for that NRI's IP address. In these embodiments, it is not required for the SGW to maintain an active/standby NRI map as all that is required is that the SGW maintain an association with an NRI and that NRI's IP address. In one embodiment, each UE session includes the IP address of the PDN-GW servicing that UE session. In this embodiment, the IP address in the UE session is the NRI's IP address and no NRI map is required as the IP address will be serviced by another PDN-GW upon the failure of the PDN-GW servicing the NRI. In this embodiment, PDN connections are associated with the NRI's IP address rather than the PDN-GW's specific IP address.

In embodiments utilizing a single IP address per PDN-GW rather than an IP address per NRI, the method continues by updating the routes to each APN slice. At point 6, new APN slice routes (e.g., RIP information) is exported from the PDN-GW pool to the applicable PDN indicating the PDN-GW IP address as the next hop for each of NRIs previously serviced by the failed PDN-GW. In embodiments with standby PDN-GWs, the RIP information for the standby PDN-GW was previously exported and all that is required is for the metric of the standby PDN-GW route be lowered and the metric of the previously active PDN-GW be raised such that the route to the newly active PDN-GW is preferred according to routing algorithms. Upon creating new standby UE sessions, new RIP information is generated for each NRI and the PDN-GW that is taking over as the standby PDN-GW for that NRI. This RIP information is exported with a higher metric than newly active RIP information and with a lower metric than the previously active RIP information.

Figure 4:
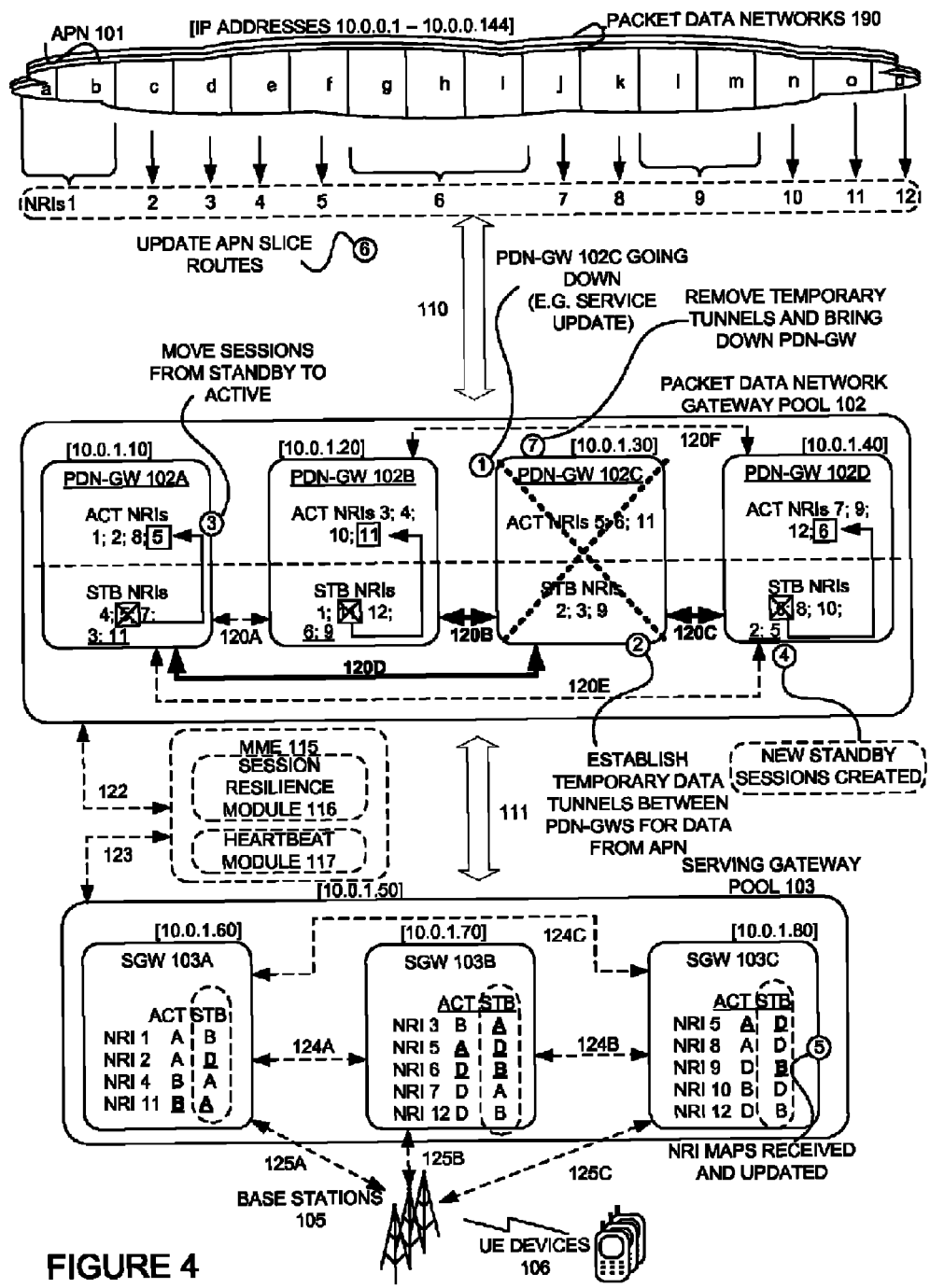
FIG. 4 is a block diagram illustrating PDN-GW pool 102 responding to a PDN-GW going down for service according to embodiments of the invention.

FIG. 4 is a block diagram illustrating PDN-GW pool 102 responding to a PDN-GW going down for service according to embodiments of the invention. This figure is identical to FIG. 1A except that it includes a plurality of points/operations and change indications that occur in response to PDN-GW 102C going down for service (indicated in the figure with a dashed X through PDN-GW 102C). In this figure, PDN-GW 102C is going down (e.g. for service updates) at point 1. Point 2 shows that temporary data tunnels are established between PDN-GW 102C and each of the other PDN-GWs 102A, 102B, and 102D as each is servicing standby UE sessions corresponding to PDN-GW 102C. The temporary data tunnels are shown across data connections 120D (between 102A and 102C), 120B (between 102B and 102C), and 120C (between 102C and 102D). These data connections are shown in bold solid lines to indicate such data connections acting as temporary data tunnels. Points 3, 4, 5, and 6 are the same as described with reference to FIG. 3 except that during this time data arriving from APN 101 that is destined for PDN-GW 102C is then forwarded to the PDN-GW that is taking over active service for the NRI from which the data is received. In this way, data coming from the NRIs will arrive at the proper PDN-GW before the RIP is updated at point 6. Information coming from the SGW pool 103 may either be sent on to the corresponding NRI without forwarding to the newly active PDN-GW for that NRI or it may be forwarded to the newly active PDN-GW for that NRI until the NRI maps are updated at point 5. In this way, the bringing down of PDN-GW 102C occurs transparently to the UE devices 106 and without incurring service interruption. Point 7 indicates that the temporary data tunnels are removed and the PDN-GW 102C is brought down after all corresponding UE sessions have been activated, new standby UE sessions have been created, and the RIP information has been exported to the APN.

Figure 5:
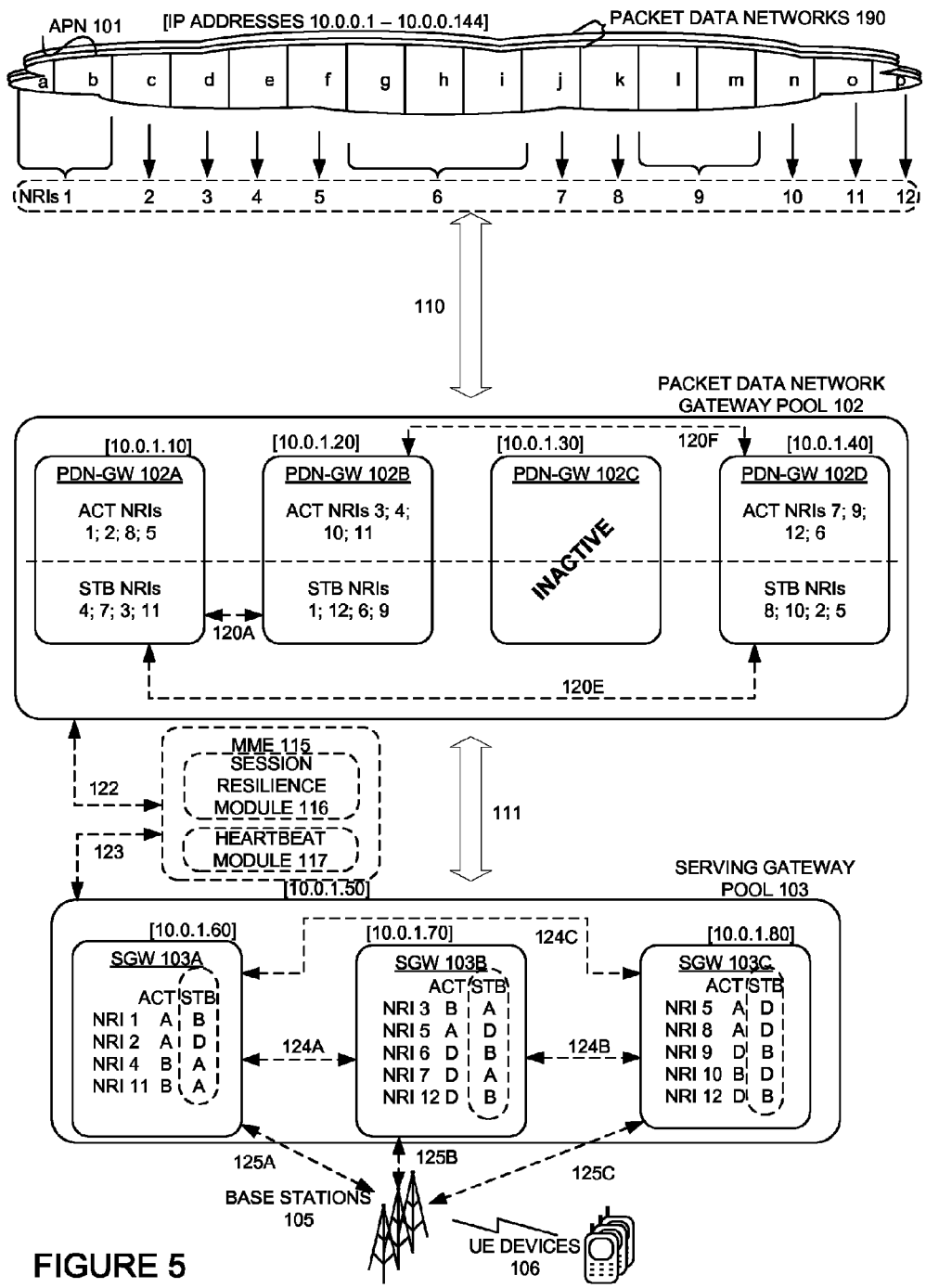
FIG. 5 is a block diagram illustrating the resulting PDN-GW pool 102 after the operations shown in FIG. 3 or 4 have been performed according to embodiments of the invention.

FIG. 5 is a block diagram illustrating the resulting PDN-GW pool 102 after the operations shown in FIGS. 3 and 4 have been performed according to embodiments of the invention. FIG. 5 is identical to FIG. 1A except that PDN-GW 102C is inactive (in a non-operational state). In FIG. 5, each of the operational PDN-GWs 102A, 102B, and 102D has additional active and standby UE sessions (as described in FIGS. 3 and 4) corresponding to activated UE sessions and newly created standby UE sessions.

Figure 6:
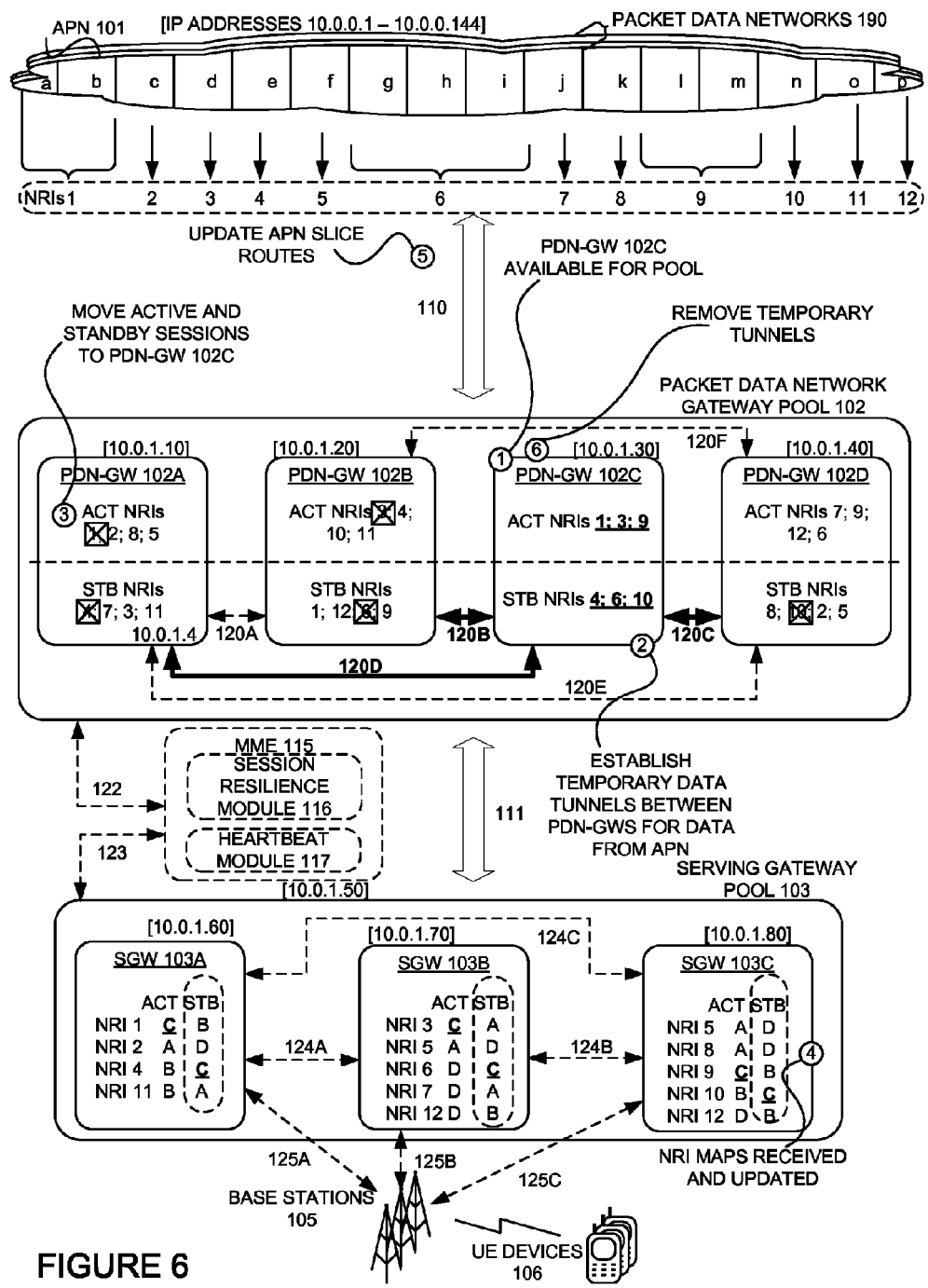
FIG. 6 is a block diagram illustrating PDN-GW pool 102 bringing up an inactive PDN-GW according to embodiments of the invention.

FIG. 6 is a block diagram illustrating PDN-GW pool 102 responsive bringing up an inactive PDN-GW (e.g., adding a new PDN-GW, replacing a PDN-GW that entered a non-operational state, or restoring a PDN-GW that entered a non-operational state) according to embodiments of the invention. FIG. 6 is identical to FIG. 5 except that PDN-GW 102C has gone from a non-operational state to an operational state and includes a plurality of points/operations and change indications that occur in response to the operational state of PDN-GW 102C. At point 1, PDN-GW 102C becomes operational and available for participation in the PDN-GW pool 102. Responsively, it is determined which of the NRIs PDN-GW 102C will take responsibility for as the active PDN-GW (and thus, the UE sessions associated with those NRIs); as well as, in embodiments that support standby UE sessions, which of the NRIs PDN-GW 102C will take responsibility for as the standby PDN-GW (and thus, the UE sessions associated with those NRIs). The entity making these determinations may be different in different embodiments (e.g., it may be PDN-GW pool 102 or it may be MME's 115 session resilience module 116). In FIG. 6, it is determined that PDN-GW 102C will become the active PDN-GW for NRIs 1, 3, and 9 and will become the standby PDN-GW for NRIs 4, 6, and 10. At point 2, temporary data tunnels are established between each PDN-GW 102A, 102B, and 102D that is an active and/or standby PDN-GW for NRIs which PDN-GW 102C is assuming some responsibility as either active or standby PDN-GW. These temporary data tunnels are established as previously described in FIG. 4. At point 3, the determined active and standby sessions are moved from PDN-GWs 102A, 102B, and 102D to PDN-GW 102C. At point 4, the NRI map entries are updated as described with reference to FIG. 3 to indicate that PDN-GW 102C has assumed active or standby responsibility for the corresponding NRIs. At point 5, the APN slice routes are updated as described with reference to point 6 in FIG. 3. At point 6, the temporary data tunnels are removed and the PDN-GW pool 102 is finished bringing up PDN-GW 102C as an operational participant in the PDN-GW pool 102. While the PDN-GW 102C is being brought up, data corresponding with UE sessions that are moving from a first active PDN-GW to PDN-GW 102C is forwarded to PDN-GE 102C across the temporary data tunnels in the same way as described with reference to FIG. 4.

FIG. 7 is a block diagram illustrating a system including a PDN, a SGW pool, and a plurality of PDN-GWs (with one being shown in an exploded view) for providing N+M pooled session resilience according to embodiments of the invention. The first PDN-GW, such as PDN-GW 102A from FIG. 1A, is coupled to one or more PDNs 190, each PDN assigned an APN and a plurality of IP addresses. Each APN sliced into a plurality of APN slices, such as APN slices 101A-101P, that are assigned a subset of the plurality of IP addresses for that PDN. The first PDN-GW 102A is further coupled to one or more other PDN-GWs, such as PDN-GWs 102B-102D, and is coupled to a SGW pool 103. The first PDN-GW 102A comprises a plurality of ports 715A-715Z, a session resilience module 716 that is coupled to the plurality of ports 715A-715Z, a processor 720, and a memory 730. The processor 720 (single or multi core; and if multi core, symmetrical or asymmetrical cores) may be of any type of architecture, such as CISC, RISC, VLIW, or hybrid architecture. The processor 720 may also include a variety of other components, such as a memory management unit and main memory bus interface (s). Furthermore, the processor 720 may be implemented on one or more die within the same chip. While this embodiment is described in relation to a single processor PDN-GW, other embodiments are multi-processor PDN-GWs. The memory 730 and data traffic represents one or more machine-readable media. Thus, machine-readable media include any mechanism that provides (i.e., stores and/or transmits) information in a form readable by a machine (e.g., a computer). For example, a machine-readable medium may be machine-readable storage media (e.g., magnetic disks; optical disks; random access memory; read only memory; flash memory devices), machine-readable communication media (e.g., electrical, optical, acoustical or other form of propagated signals—such as carrier waves, infrared signals, digital signals, etc.); etc.

In one embodiment, the session resilience module 716 is a sub-module within a processor 720 while in other embodiments the session resilience module 716 is a separate module that is coupled to the processor 720. The session resilience module 716 is configured to receive information corresponding to UE sessions which the first PDN-GW 102A is servicing as the active PDN-GW upon the initiation of PDN connections. The session resilience module 716 is configured to store the active UE session information and periodically transmit the active UE session information to one of the one more other PDN-GWs 102B-102D that are acting as standby PDN-GWs for the UE sessions represented by the UE session information. In one embodiment, the session resilience module 716 includes an active UE session module 716A that stores and maintains the active UE sessions on the first PDN-GW 102A. In another embodiment, the session resilience module 716 is coupled to the memory 730 and the active UE session information is stored in memory 730.

The session resilience module 717 is further configured to receive information corresponding to UE sessions which the first PDN-GW 102A is serving as the standby PDN-GW. The first PDN-GW 102A receives UE session information from one of the other PDN-GWs 102B-102D that is the active PDN-GW for that UE session. This information is kept in synchronization on the first PDN-GW as a standby UE session so that the first PDN-GW 102A can activate the standby UE session if and when the corresponding one of the other PDN-GWs enters a non-operational state. In one embodiment, the session resilience module 716 includes a standby UE session module 716B that stores and maintains the standby UE sessions on the first PDN-GW 102A. In another embodiment, the session resilience module 716 is coupled to the memory 730 and the standby UE session information is stored in memory 730.

The session resilience module 716 is further configured to recognize when a second PDN-GW enters a non-operational state and, in response, to activate one or more of a plurality of standby UE sessions that are each associated with UE sessions on the second PDN-GW. Further, the session resilience module 716 is configured to notify the SGW pool 103 that the first PDN-GW 102A has activated the one or more of the plurality of standby UE sessions. The session resilience module 716 may be implemented in hardware, software, or a combination of both.

In one embodiment, such as where the MME is not informing the PDN-GWs that other PDN-GWs are entering the non-operational state, the first PDN-GW 102A further comprises a heartbeat module 717 that is coupled to the plurality of ports 715A-715Z. The heartbeat module 717 is configured to transmit status inquiry messages to the one or more other PDN-GWs 102B-102D and notify the session resilience module 716 when one of the one or more other PDN-GWs 102B-102D does not respond to the status inquiry message. In response to the failure to respond, the session resilience module 716 can activate any standby UE sessions that are associated with an active UE session on the failed PDN-GW. In an embodiment where the MME is informing the PDN-GWs that other PDN-GWs are entering the non-operational state, the MME would be performing the heartbeat functionality and the PDN-GWs would be coupled to the MME through one of the plurality of ports 715A-715Z. Of course, the PDN-GW 103A includes a variety of other components that are not shown in order to avoid obscuring the invention.

FIG. 8 is a block diagram illustrating a system including a PDN-GW, a UE device, and a set of one or more SGWs (with one being shown in an exploded view) for providing N+W pooled session resilience according to embodiments of the invention. The first SGW, such as SGW 103A, is coupled to one or more base stations 105 which further couple the first SGW 103A with one or more UE devices 106. The first SGW is further coupled to a PDN-GW pool 102 and, optionally, to one or more other SGWs 103B-103C. The first SGW 103A comprises a plurality of ports 815A-815Z, a session resilience module 818 that is coupled to the plurality of ports 815A-815Z, a processor 820, and a memory 830. The processor 820 (single or multi core; and if multi core, symmetrical or asymmetrical cores) is of any type of architecture, such as CISC, RISC, VLIW, or hybrid architecture. The processor 820 may also include a variety of other components, such as a memory management unit and main memory bus interface(s). Furthermore, the processor 820 may be implemented on one or more die within the same chip. While this embodiment is described in relation to a single processor SGW, other embodiments are multi-processor SGWs. The memory 830 further represents a machine-readable storage media.

In one embodiment, the session resilience module 818 is a sub-module within a processor 820 while in other embodiment the session resilience module 818 is a separate module that is coupled to the processor 820. The session resilience module 818 is configured to maintain a plurality of UE sessions and maintain a NRI map. The NRI map, as described with reference to FIGS. 1-6, contains a plurality of NRI map entries. Each NRI map entry pertains to one or more UE sessions serviced by the SGW and includes information designating an active PDN-GW in the PDN-GW pool 103 for the NRI associated with the one or more UE sessions. In one embodiment, the NRI map entries further include information associating a standby PDN-GW in the PDN-GW pool 103 with the corresponding NRI. However, in embodiments in which each NRI is assigned an individual IP address, it is not necessary for the NRI map entries to contain standby PDN-GW information because the same address will be used in the event that the standby PDN-GW becomes the active PDN-GW for an NRI. In one embodiment, the session resilience module 818 stores the NRI map entries in the memory 830 while other embodiments include memory within the session resilience module in which the NRI map entries are stored. The session resilience module 818 is configured to route traffic for each UE session to the active PDN-GW designated in the NRI map for that UE session's corresponding NRI. The session resilience module is further configured to receive notification that one of a plurality of PDN-GWs in the PDN-GW pool 103 entered a non-operational state, and, in response, begin routing traffic previously destined to the non-operation PDN-GW to other PDN-GWs in the PDN-GW pool 103. In embodiments in which the NRI map contains information designating a standby PDN-GW for each NRI, the session resilience module updates the NRI map entry to designate the standby PDN-GW as the active PDN-GW for NRI map entries previously designating the non-operational PDN-GW as the active PDN-GW. In this way, upon receiving notification of the non-operational PDN-GW, the session resilience module can switch to the standby PDN-GW for UE sessions associated with the non-operational PDN-GW. Further, the session resilience module is configured to receive NRI map update messages that indicate active and/or standby PDN-GWs for one or more NRIs. In response to receiving the NRI map update message, the session resilience module 818 updates the corresponding NRI map entries. The session resilience module 818 may be implemented in hardware, software, or a combination of both.

In one embodiment, where each SGW in the SGW pool 103 services active and standby UE sessions (such as shown in FIG. 1B), the first SGW 103A further comprises a heartbeat module 819 that is coupled to the plurality of ports 815A-815Z. The heartbeat module 817 is configured to transmit status inquiry messages to the one or more SGWs 103A-102C in the SGW pool 103 and notify the session resilience module 818 when one of the one or more SGWs 103A-103C does not respond to the status inquiry message. In response to the failure to respond, the session resilience module 818 can activate one or more standby UE sessions for NRIs associated with the failed SGW. In an embodiment where the MME is informing the SGWs that other SGWs are entering the non-operational state, the MME would perform the heartbeat functionality and the SGWs would be coupled to the MME through one of the plurality of ports 815A-815Z. Of course, the SGW 103A includes a variety of other components that are not shown in order to avoid obscuring the invention.

ALTERNATIVE EMBODIMENTS

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed in a first packet data network gateway (PDN-GW) in a PDN-GW pool, the PDN-GW pool for providing data connectivity between user equipment (UE) devices and an external PDN through an access point name (APN), wherein the first PDN-GW is coupled to a second PDN-GW and the method is for providing UE session resilience by allowing the first PDN-GW to provide connectivity for a set of one or more UE sessions previously serviced by the second PDN-GW after the second PDN-GW becomes non-operational, the method comprising the steps of:

recognizing that the second PDN-GW is entering a non-operational state;

establishing a temporary data tunnel with the second PDN-GW to be used by the second PDN-GW to forward data traffic received for the set of UE sessions to the first PDN-GW to prevent service interruption to the set of UE sessions through a graceful switchover;

receiving, over the temporary data tunnel from the second PDN-GW, the forwarded data traffic of the set of UE sessions;

activating a set of one or more standby UE sessions, wherein the set of standby UE sessions are synchronized copies of the set of UE sessions for which the second PDN-GW was the active PDN-GW, each of the set of UE sessions being associated with a UE device and a network resource identifier (NRI) that identifies an APN slice which corresponds with a subset of internet protocol addresses in the external PDN;

transmitting a message to a serving gateway (SGW), the SGW for providing data connectivity between one or more of the UE devices and the PDN-GW pool, wherein the message indicates that the first PDN-GW has activated the set of standby UE sessions associated with one or more UE devices serviced by the SGW to cause the SGW to direct traffic previously bound for the second PDN-GW to the first PDN-GW; and closing the temporary data tunnel after the SGW begins directing the traffic previously bound for the second PDN-GW to the first PDN-GW, whereby UE session resilience is achieved in a PDN-GW pool by allowing the first PDN-GW to activate the set of standby UE sessions without notifying each of the UE devices associated with the standby UE sessions on the first PDN-GW and without causing service interruption to the set of UE sessions.

2. The method of claim 1, wherein the message transmitted to the SGW indicates a plurality of NRIs, each NRI associated with one or more of the set of standby UE sessions associated with a UE device serviced by the SGW.

3. The method of claim 1, where the message transmitted to the SGW is a NRI map update message that indicates updates to a plurality of NRI map entries, each NRI map entry indicating an active PDN-GW and a standby PDN-GW for a particular NRI and the NRI map update message includes entries corresponding to NRIs associated with one or more of the set of standby UE sessions.

4. The method of claim 1, further comprising updating the data route between the APN slices associated with the NRIs of the set of standby UE sessions.

5. A method performed in a serving gateway (SGW), the SGW for providing data connectivity between user equipment (UE) devices and a packet data network gateway (PDN-GW) pool that provides data connectivity between an external PDN and the SGW, wherein the SGW is coupled to a first PDN-GW and a second PDN-GW in the PDN-GW pool and the method is for providing UE session resilience by allowing the SGW to reroute traffic between the PDN-GW pool and UE device from the first PDN-GW to the second PDN-GW, the method comprising the steps of:

creating a network resource identifier (NRI) map by inserting a plurality of NRI map entries including a first NRI map entry, wherein the first NRI map entry associates a first NRI with the first PDN-GW as an active PDN-GW for the first NRI, wherein the first NRI is associated with a first slice of an access point name (APN) that corresponds with a subset of internet protocol addresses in the external PDN, wherein the UE device is in communication with the first slice of the APN, wherein the creating of the NRI map further comprises associating the first NRI with the second PDN-GW as a standby PDN-GW for the first NRI;

routing data traffic for a UE session to the first PDN-GW, wherein the UE session is for traffic between the UE device and the first slice of the APN;

responsive to receiving one or more messages indicating that the first PDN-GW entered a non-operational state and that the second PDN-GW has assumed responsibility as the active PDN-GW for the first NRI and that a third PDN-GW has assumed responsibility as a standby PDN-GW for the first NRI:

updating the first NRI map entry to indicate an association between the first NRI and the second PDN-GW as the active PDN-GW for the first NRI, routing data traffic for the UE session to the second PDN-GW;

whereby UE session resilience is achieved by allowing the SGW to reroute data traffic from the UE device to an active PDN-GW without notifying the UE device of a change from the first PDN-GW to the second PDN-GW as the active PDN-GW.

6. The method of claim 5, wherein the received one or more messages further indicate that the second PDN-GW has assumed responsibility as the active PDN-GW for UE sessions that are between the first NRI and UE devices communicating with slices in the APN associated with the first NRI.

7. The method of claim 5 further comprising the steps of:

associating each NRI map entry with a standby PDN-GW, wherein the first NRI map entry is associated with the second PDN-GW as the standby PDN-GW for that NRI and wherein a second NRI map entry is associated with the first PDN-GW as the active PDN-GW for that NRI;

in response to the receiving of the one or more messages:

determining a standby PDN-GW from the NRI map entries for all NRI map entries indicating that first PDN-GW is the active PDN-GW for those NRIs, and updating all NRI map entries indicating that the first PDN-GW is the active PDN-GW to indicate that the standby PDN-GW of each entry is now the active PDN-GW for that entry.

8. A first packet data network gateway (PDN-GW) to be coupled to a second PDN-GW in a PDN-GW pool, the PDN-GW pool to provide data connectivity between an external PDN and a user equipment (UE) device, the first PDN-GW to provide UE session resilience by providing data connectivity for UE sessions previously serviced by the second PDN-GW after the second PDN-GW becomes non-operational, the first PDN-GW comprising:

a processor;
 a set of one or more ports coupled to the processor and to be coupled to a serving gateway (SGW) pool;

a memory coupled to the processor to store information for a plurality of active UE sessions and a plurality of standby UE sessions, each active and standby UE session to be associated with a UE device and a network resource identifier of an access point name (APN) slice, wherein the APN slice corresponds to a subset of Internet protocol (IP) addresses in the external PDN; and a session resilience module coupled to the memory to maintain the information for the plurality of active and standby UE sessions, the session resilience module configured to:

recognize when the second PDN-GW is to enter a non-operational state, establish a temporary data tunnel with the second PDN-GW to be used by the second PDN-GW to forward data traffic to the first PDN-GW that is received for a set of one or more UE sessions that the second PDN-GW was the active PDN-GW for and that the first PDN-GW was the standby PDN-GW for, receive, over the temporary data tunnel from the second PDN-GW, the forwarded data traffic of the set of UE sessions, activate one or more of the plurality of standby UE sessions, each activated standby UE session to be associated with the second PDN-GW, notify the SGW pool that the first PDN-GW has activated the one or more of the plurality of standby UE sessions, and close the temporary data tunnel after the SGW begins directing the traffic previously bound for the second PDN-GW to the first PDN-GW;

whereby UE session resilience is achieved in a PDN-GW pool by allowing the first PDN-GW to activate a plurality of standby UE sessions without notifying each UE device associated with a standby UE session on the first PDN-GW and without causing service interruption to the set of UE sessions.

9. The first PDN-GW of claim 8, further comprising:

a heartbeat module coupled with the set of one or more ports and the session resilience module, the heartbeat module configured to transmit a status inquiry message to the second PDN-GW and notify the session resilience module when the second PDN-GW fails to respond.

10. The first PDN-GW of claim 8, wherein the session resilience module is further configured to:

receive UE session data from the second PDN-GW corresponding to one or more of the plurality of standby UE sessions; and update the one or more of the plurality of standby UE sessions according to the received UE session data.

11. A serving gateway (SGW) to be coupled to a user equipment (UE) device and a packet data network gateway (PDN-GW) pool comprised of a first PDN-GW and a second PDN-GW, the SGW to provide data connectivity between the UE device and the PDN-GW pool and provide UE session resilience by allowing the SGW to reroute traffic between the PDN-GW pool and UE device from the first PDN-GW to the second PDN-GW, the SGW comprising:

a processor;
 a set of one or more ports coupled to the processor and to be coupled to one or more access point name (APN) slices, each APN slice corresponding with a subset of internet protocol addresses in the external PDN;

a memory coupled to the processor to store a network resource identifier (NRI) map configured to store NRI map entries that associate a NRI with an active PDN- GW and a standby PDN-GW, wherein each NRI identifies one or more APN slices; and a session resilience module coupled to the memory, the session resilience module to maintain a plurality of UE sessions, maintain the NRI map, and configured to:
create a first NRI map entry to associate a first NRI with the first PDN-GW as the active PDN-GW for the first NRI,
route data traffic associated with the first NRI to the first PDN-GW,
receive notification that the first PDN-GW entered a non-operational state,
receive one or more NRI map update messages that are to indicate an update to the first NRI map entry,
update the first NRI map entry according to the one or more NRI map update messages to associate the first NRI with the second PDN-GW as the active PDN-GW for the first NRI and to associate the first NRI with a third PDN-GW as the standby PDN-GW for the first NRI, and
route data traffic associated with the first NRI to the second PDN-GW;

whereby UE session resilience is achieved by allowing the SGW to reroute data traffic from the UE device to an active PDN-GW without notifying the UE device of a change from the first PDN-GW to the second PDN-GW as the active PDN-GW.

* * * * *